United States Patent [19]
Doherty

[11] 3,842,295
[45] Oct. 15, 1974

[54] SINGLE STROKE TOOL AND MEANS FOR STORING ENERGY THEREIN

[76] Inventor: Norman R. Doherty, 870 Main St., Farmingdale, N.Y. 11735

[22] Filed: Aug. 10, 1972

[21] Appl. No.: 279,643

[52] U.S. Cl............... 310/12, 124/16, 128/173 H, 310/14, 335/255
[51] Int. Cl. ............................................ H02k 41/00
[58] Field of Search ............. 310/14, 28, 30; 320/2; 335/253, 254, 255; 128/173 H, 218 F, DIG. 1, 303, 305; 185/35, 37, 39, 40 R, 40 B; 74/2; 124/3, 14, 16; 173/53, 119, 120; 81/52.3, 52.35

[56] References Cited
UNITED STATES PATENTS

| | | | |
|---|---|---|---|
| 2,262,061 | 11/1941 | Somers | 335/254 X |
| 2,605,763 | 8/1952 | Smoot | 128/173 H |
| 3,207,961 | 9/1965 | Lohr | 335/255 |
| 3,418,552 | 12/1968 | Holmos | 320/2 |
| 3,461,867 | 8/1969 | Zimmet et al. | 128/173 H |

*Primary Examiner*—J. D. Miller
*Assistant Examiner*—Harry E. Moose, Jr.
*Attorney, Agent, or Firm*—Leonard H. King

[57] ABSTRACT

Electrically operated means are disclosed for energizing a single stroke tool. A housing including an electrically energizable, annular coil is provided, into which a magnetizable core member is inserted. When current is applied, a magnetic field is induced that will axially displace the magnetizable core member which is suitably attached to a tool. Axial movement of the core member, in combination with a latchable trigger assembly, compresses spring means in the tool, which thereby stores mechanical energy. The mechanical energy may be released by depressing the trigger and thereby provide a single burst of energy for actuating the tool.

4 Claims, 20 Drawing Figures

PATENTED OCT 15 1974　3,842,295

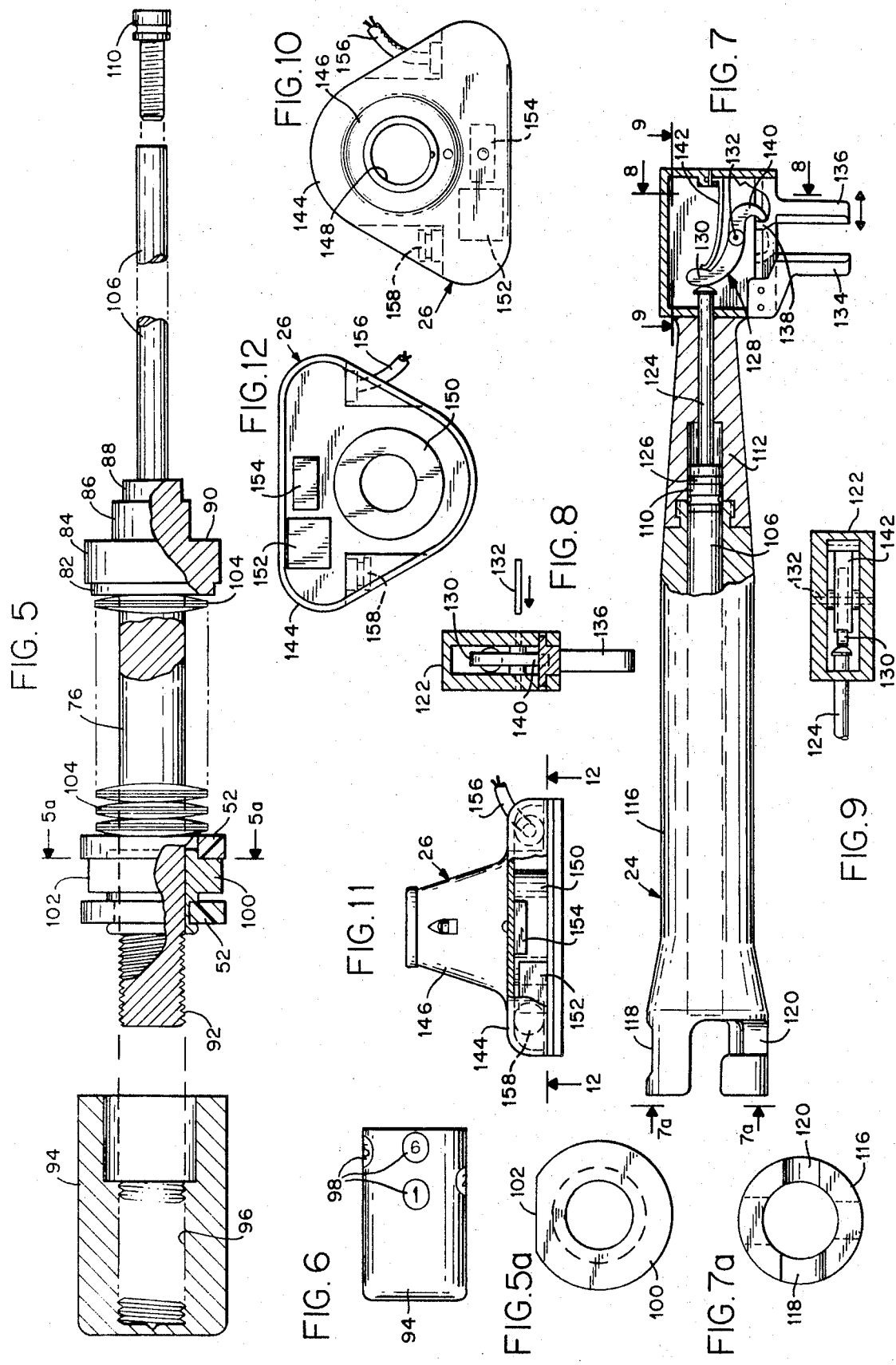

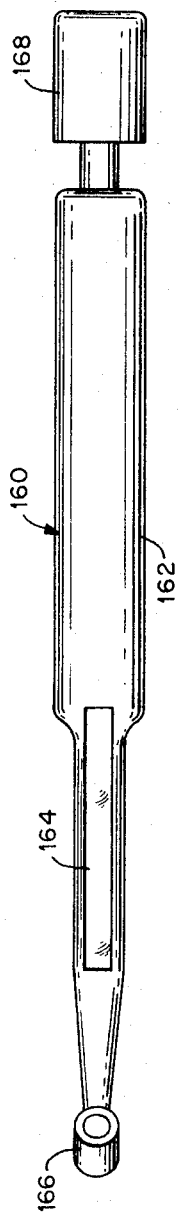
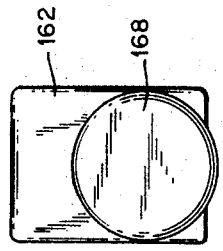
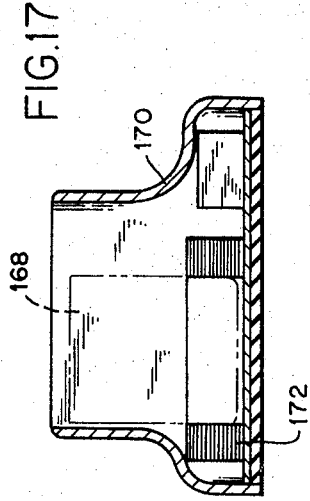
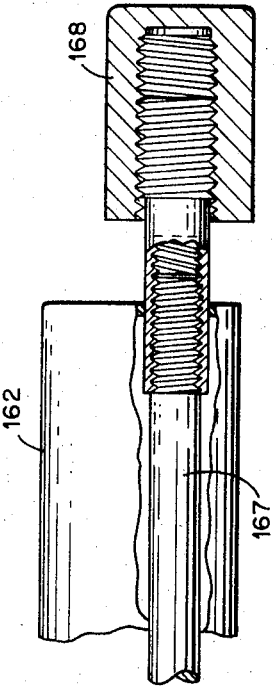
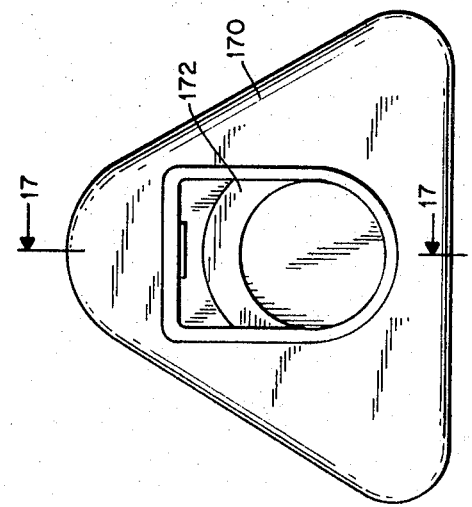

SINGLE STROKE TOOL AND MEANS FOR STORING ENERGY THEREIN

The aforementioned Abstract is neither intended to define the invention of the application which, of course, is measured by the claims, nor is it intended to be limiting as to the scope of the invention in any way.

BACKGROUND OF THE INVENTION

1. Field of the Invention

This invention relates generally to single stroke tools or the like and, more particularly, to improved means for storing mechanical energy within the tool.

2. Description of the Prior Art

Single stroke tools have a wide variety of uses. For example, devices such as needleless injectors, as disclosed in the Zimmet et al., U.S. Pat. No. 3,461,867, granted on Aug. 19, 1969, use the basic concept to which the present invention is directed. Various other types of cutting tools such as clippers or the like may also be used advantageously with the present invention.

SUMMARY OF THE INVENTION

The present invention provides an electrically energizable core that sets up a magnetic field when a switch in series therewith and in series with a source of electrical energy is closed. A magnetizable core which has been inserted within a magnetic field and which is suitably coupled to the tool is moved in an axial direction by means of the magnetic field. Spring means cooperating with the core are compressed and are held in the compressed condition by means of a latching trigger. When the device is removed from the coil with the spring compressed it is then ready for its intended single stroke usage merely by depressing the trigger to unlatch the core and thereby release the stored mechanical energy that drives the tool.

Accordingly, it is an object of the present invention to provide improved means for storing energy in a single stroke tool.

It is another object of the present invention to provide improved means for mechanically compressing a spring such as used in a single stroke tool.

These and other objects, features and advantages of the invention will, in part, be pointed out with particularity and will, in part, become obvious from the following more detailed description of the invention taken in conjunction with the accompanying drawings which forms an integral part thereof.

An additional object of the invention is to provide a single stroke tool having an axially movable, magnetizable core, and integral source of mechanical energy and an electrically energizable coil for displacing the core and thereby loading or cocking the source of mechanical energy for release and actuation of the tool by means of a latching trigger.

A feature of this invention is that the tool portion is readily detachable and interchangeable.

An advantage of this invention is that only a single hand need be used for rapidly cocking the tool.

BRIEF DESCRIPTION OF THE DRAWING

In the various figures of the drawing like reference characters designate like parts.
In the drawing:

FIG. 5 is a fragmentary, longitudinal view, partially in section and partially broken away illustrating other structure of the apparatus shown in FIG. 1;

FIG. 5a is a transverse elevational view taken along line 5a—5a of FIG. 5;

FIG. 6 is an elevational view of the armature components shown in FIG. 5;

FIG. 7 is a fragmentary elevational view, partially in section, illustrating the head portion of the apparatus shown in FIG. 1 on an enlarged scale;

FIG. 7a is an end elevational view, taken along line 7a—7a of FIG. 7;

FIG. 8 is a sectional elevational view taken along line 8—8 of FIG. 7;

FIG. 9 is a sectional plan view taken along line 9—9 of FIG. 7;

FIG. 10 is a plan view of the base portion of the apparatus shown in FIG. 1;

FIG. 11 is an elevational view of the base portion shown in FIG. 10 with a portion thereof broken away and in section;

FIG. 12 is a bottom plan view taken along line 12—12 of FIG. 11;

FIG. 13 is a plan view of an alternative embodiment of the present invention;

FIG. 14 is an enlarged longitudinal view, partially in section, of the right hand end portion of FIG. 13;

FIG. 15 is an end elevational view of the structure shown in FIG. 13.

FIG. 16 is a plan view of an alternative embodiment of the base section of the present invention adapted to accommodate the device shown in FIG. 13; and FIG. 17 is a sectional elevational view taken along line 17—17 of FIG. 16.

DESCRIPTION OF THE PREFERRED EMBODIMENT

Figure 1:
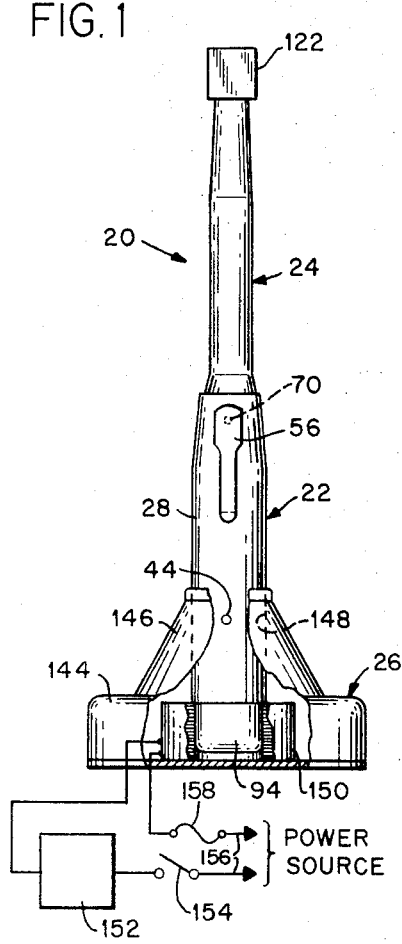
FIG. 1 is a front elevational view, partially broken away and partially in section, illustrating one possible embodiment of the present invention.
Figure 2:
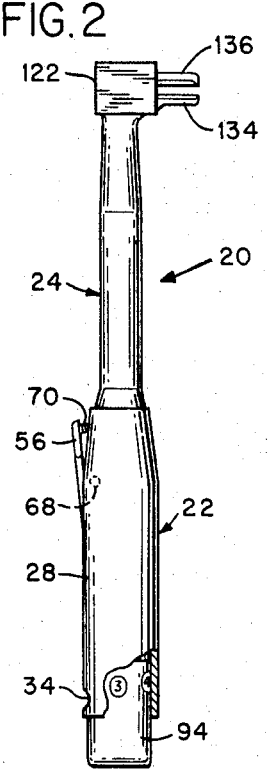
FIG. 2 is a side elevational view of the apparatus shown in FIG. 1 with a portion thereof broken away.
Figure 3:
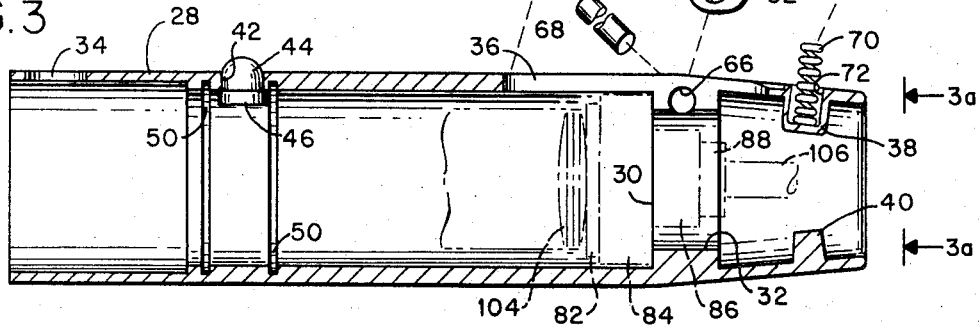
FIG. 3 is a longitudinal sectional view with parts thereof exploded and illustrating the construction of one portion of the present invention.
Figure 4:
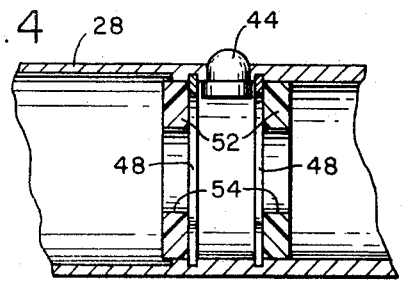
FIG. 4 is a fragmentary, longitudinal sectional view of a portion of the structure shown in FIG. 3.
Figure 3A:
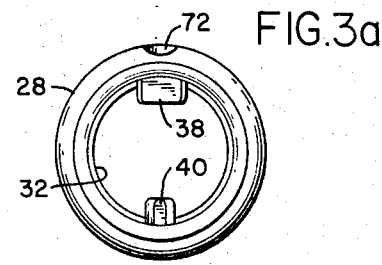
FIG. 3a is an end elevational view taken along line 3a—3a of FIG. 3.

Referring now to the drawings there is shown, in FIG. 1 and in FIG. 2, one embodiment of the present invention which is designated generally by the reference character 20. The invention comprises a power pack section 22, a tool section 24 that is removably coupled to the power pack section 22 in a manner to be described more fully hereinafter and an actuating base section 26 that cooperates with the power pack section 22. A feature of the present invention is that the power pack section 22 may be readily coupled to and uncoupled from any one of a number of different tools which are generally characterized by the reference numeral 24.

The power pack section 22 is comprised of a tubular body portion 28 which includes, in part, a transverse wall 30 having an axially extending bore 32 formed therethrough. For purposes to be described hereinafter, the body portion 28 is also provided with an opening 34 formed through its wall at the left hand end thereof, an elongated longitudinal slot 36 formed through the wall proximate the right hand end thereof and a pair of keying members defined by radially inward extending integral pin-like projections 38 and 40 formed at the right hand end thereof. In addition, there is also provided another radially extending opening 42 in the wall of the body portion 28 and a button 44 is positioned within the opening 42 with the head 46 of the button 44 being disposed on the inside wall surface of the body portion 28. For purposes to be described hereinafter, a pair of retaining rings 48 are positioned in pair of internal, annular slots 50 in axially opposite sides of the opening 42. A pair of resilient washers 52, each having a central bore 54 therethrough, are positioned on axially opposite sides of the retaining rings 52.

A trigger member 56 having an actuating portion 58 at one end and a lip 60 at the other end thereof is pivotally and resiliently positioned in the slot 36. In order to mount the trigger 56, a tab 62 is provided having an opening 64 formed therein. In the assembled condition, the opening 64 in the tab 62 registers with a chordally oriented opening 66 formed in the body portion 28 proximate the transverse wall 30 thereof. A pin 68 that acts as a pivot member is inserted in the aligned openings 64 and 66. There is also provided a compression spring 70, one end of which is seated within an outwardly opening recess 72 formed in the pin-like projection 38 while the other end of the spring 70 is positioned within an oppositely facing recess 74 formed on the underside of the right hand end or actuating portion 58 of the trigger 56. Thus, the trigger 56 is normally biased in a counter-clockwise direction about the pivot member 68 by the spring 70.

As shown in FIGS. 5 and 6, the power pack section 22 of the present invention is further comprised of a rod 76 having several diametric portions 82, 84, 86 and 88. A transverse interface 90 is formed between the diametric portions 84 and 86. At its opposite end, the rod 76 is provided with external threads 92. A magnetizable cap member 94 is provided with a threaded bore 96 that is adapted to mate with the external threads 92 formed on the left hand end of the rod 76. The cap member 94 is further provided with indicia 98 on the external surface thereof. The indicia 98 are located along a helical path and are adapted to register throught the opening 34 formed in the body portion 28. Thus, when the cap member 94 is rotated in either direction, the length of stroke of the rod 76 will change and the indicia 98 will provide an arbitrary indication thereof.

A collar 100 having a partially flat periphery 102 is mounted on the rod 76 intermediate the resilient washers 52. The flatted head 46 of the button 44 bears against the flat peripheral portion 102 of the collar 100 in order to prevent relative rotation thereof. The retaining rings 48 prevent relative axial movement of the collar 100. To provide the required source of mechanical energy, a plurality of belleville washers 104 or other compression spring means are mounted on the rod 76 intermediate the diametrical portion 82 and the right hand resilient washer 52.

Secured to or integral with the rod 76 there is a second rod 106 that extends to the right as shown in FIG. 5. The rod 106 is provided with a threaded member 110 that is received in the right hand end thereof.

The tool section 24 of the present invention is comprised of a first body member 112 and a second, generally tubular body member 116 having a pair of bayonet slots 118 and 120 at the left hand end thereof as shown in FIGS. 7 and 7a. The slots 118 and 120 are sized differently and are adapted to mate with the radially inwardly extending pin-like projections 38 and 40. Body member 112 is removably connected to body member 116 as by bayonet means or by mating threads as illustrated in FIG. 7. At the right hand end of the body member 112 there is provided a hollow head 122 containing actuating means for the present invention. A plunger 124 is mounted in the body member 112 and extends into the hollow head 122. A resilient member 126 is provided intermediate the left hand end of the plunger 124 and the threaded member 110 at the right hand end of the rod 106. The threaded member 110 permits adjustment of the effective shaft length. It should be clearly understood that the actuating mechanism in FIGS. 7, 8, and 9 is shown by way of example only and without intention of being limiting. It should be further understood that many other single action devices may be substituted therefor without departing from the concept and spirit of the present invention.

In the embodiment illustrated in FIGS. 7, 8 and 9, the actuating mechanism of the present invention is comprised of a bell-crank type lever 128 having a first leg 130 that is arranged to bear against the right hand end of the plunger 124. A pivot pin 132 supports the lever 128 for rotation about a transverse axis. The tool illustrated is intended to be a single action cutter mechanism which is comprised of a fixed blade 134 and a movable blade 136 cooperating therewith.

The movable blade 136 is provided with a lip 138 that is engaged by the second arm 140 of the ball-crank 128. A return spring 142 bears against the bell-crank leg 130 and is used to return the movable cutting leg 136. As mentioned earlier, other single action mechanism may be substituted for the mechanism shown in FIG. 7. An example of such structure will be described in connection with the second embodiment.

The mechanism for loading and storing the energy of the belleville washers 104 is shown in FIGS. 1, 10, 11 and 12 and will now be described. The actuating base section 26 is comprised of a housing 144 having an upwardly extending column 146 in which a bore 148 is formed. A wound wire coil 150 is positioned at the bottom of the housing 144 concentrically with the bore 148 and is connected in series with a conventional triggering circuit 152 and a switch 154. The structure and function of the triggering circuit 152 may, for example, be of the type disclosed in U.S. Pat. No. 3,469,122 granted on Sept. 23, 1969 to Norman R. Doherty. One of the contacts of the switch 154 and the coil 150 are adapted to be connected to a convenient source of electrical power by means of a line cord 156. A suitable fuse 158 in series connection may also be employed.

When the device 20 is positioned, as shown for example in FIG. 1, and the switch 154 is closed, a magnetic field will be induced by the coil 150. This will cause the rod 76, which is made of a magnetizable material, to be drawn downwardly thus compressing the belleville washers 104. Since the trigger 56 is normally biased in a counter-clockwise direction, the lip 60 thereof will engage the transverse wall 90 of the rod 76 after it has been drawn downwardly and will prevent the rod 76 from again moving upwardly. Thus, the energy of the belleville washers 104 will be stored until needed. When the right hand end portion 58 of the trigger 56 is depressed, the spring 70 will be compressed and the lip 60 will be disengaged from the transverse wall 90 thus allowing the rods 76 and 106 to move to the right (FIG. 7). This movement causes the plunger 124 to move axially to the right and thereby angularly displace the bell-crank 128 in a clockwise direction about the pivot 132. Thus the movable cutting leg 136 will be driven in a direction towards the fixed cutting leg 134 as shown in phantom outline in FIG. 7. The force of the belleville washers 104 may be varied by rotating the cap 94 and thus exposing different indicia 98 through the opening 34 to thereby give an indication of the force available. After the trigger 56 is released, the spring 70 will once again bias the trigger 56 in a counter-clockwise direction in which position it is available for latching the rod 76 when the device 20 is once again placed within the base member 26 and the switch 154 is closed.

An alternative embodiment of the present invention is shown in FIGS. 13–17. For purposes of this description, the structure shown herein is substantially the same as that disclosed in U.S. Pat. No. 3,461,867 granted to A. L. Zimmet et al. on Aug. 19, 1969. The Zimmet et al structure, generally designated by the reference character 160 is comprised of a body portion 162 that houses the means 164 for supporting a vial and a discharge head 166 for expelling a metered quantity of a fluid through the patient's skin without piercing. A plunger assembly 167 is provided with stored mechanical energy by means of a complex lever system that latches a trigger in much the same manner as described hereinabove. However, in order to overcome the necessity for using the mechanically actuated lever of Zimmet et al, the present invention provides a magnetizable core member 168 secured to the end of the plunger assembly 167.

When the magnetizable core member 168 is inserted in a base member 170, such as shown in FIGS. 16 and 17 and which is functionally equivalent to the first described embodiment, an electrically energizable coil 172 establishes a magnetic field that axially displaces the core member 168 shown in phantom outline in FIG. 17. Thus, the plunger assembly 167 which includes the spring means described hereinbefore is fully loaded and ready for use by depressing a suitable trigger in the manner described hereinabove.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. The combination of a single stroke tool having an axially displaceable magnetizable core, a housing having a bore therein, a coil-like member positioned within said housing concentrically with said bore and arranged to removably receive said magnetizable core, said coil-like member being adapted to be connected to a source of electrical energy and switch means connected in series with said coil-like member.

2. The combination in accordance with claim 1 wherein said tool further comprises means for biasing said core when said coil-like member is electrically energized and latch means for releasably retaining said core when said coil-like member is electrically energized.

3. The combination in accordance with claim 2 wherein said biasing means is a compression spring and wherein there is further included means for compressing said spring when said coil-like member is electrically energized.

4. The combination in accordance with claim 1 wherein said tool is a needleless injector.

* * * * *